Dec. 22, 1959 H. A. SHERWOOD 2,917,930

DRIVE MEANS FOR TRANSDUCER IN RECORDING AND REPRODUCING MACHINE

Filed Nov. 4, 1955 2 Sheets-Sheet 1

INVENTOR.

Henry A. Sherwood

BY

Munn, Liddy, Nathanson & March

ATTORNEYS

Dec. 22, 1959 H. A. SHERWOOD 2,917,930
DRIVE MEANS FOR TRANSDUCER IN RECORDING AND REPRODUCING MACHINE
Filed Nov. 4, 1955 2 Sheets-Sheet 2
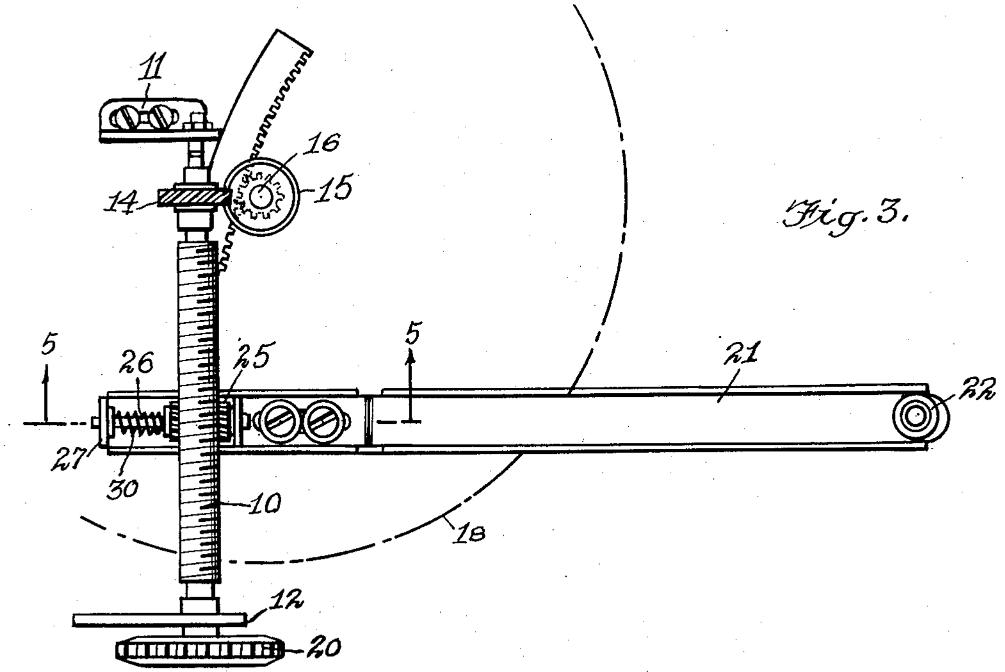
Fig. 3.
Fig. 4.
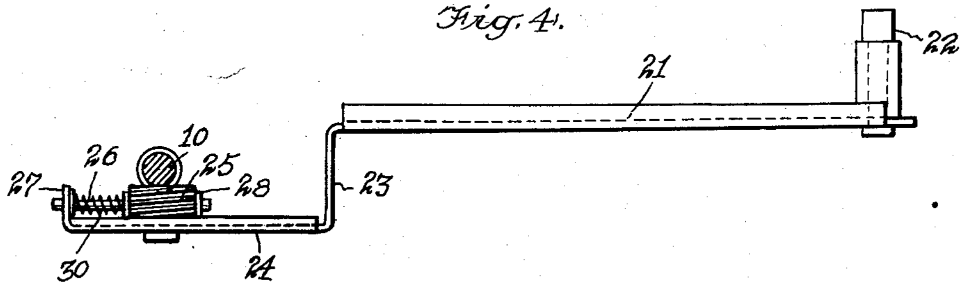
Fig. 6.
Fig. 5.
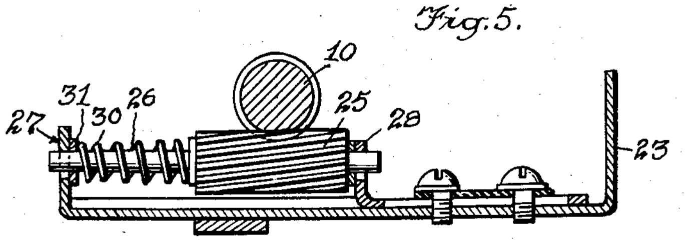
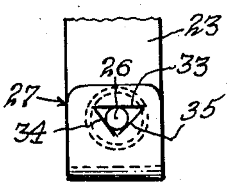
INVENTOR.
Henry A. Sherwood
BY
Munn, Liddy, Nathanson & March
ATTORNEYS United States Patent Office 2,917,930
Patented Dec. 22, 1959

2,917,930

DRIVE MEANS FOR TRANSDUCER IN RECORDING AND REPRODUCING MACHINE

Henry A. Sherwood, Woodbridge, Conn.

Application November 4, 1955, Serial No. 544,962

8 Claims. (Cl. 74—25)

This invention relates to machines for recording and/or reproducing sound, and more particularly to such machines wherein a recording and reproducing head or transducer is driven over a record medium by a forced feed.

The invention is shown as applied to a recording and reproducing machine wherein the recording medium comprises a record disk; however, it should be understood that the invention it not limited to the specific embodiment illustrated and described, since it has utility in connection with various and different transducers actuated by forced-feed mechanisms regardless of the form or shape of the recording medium.

Heretofore it has been the practice to provide, in a recording machine, a tone arm carrying the recording head, said tone arm being drivingly connected with a feed arm which was engaged by an elongate feed screw to provide a uniform, positive movement to said arms and the transducer thereof. In these machines, means were provided by which the said driving action could be manually overruled, such means comprising in many instances a mechanism by which the feed arm is disengaged from the feed screw.

In these prior machines, the feed-arm disengaging means has often been noisy, and was inaccurate when becoming engaged. Also, it normally presented a backlash problem, in that lost motion was present which interfered with the most efficient operation of the apparatus. Moreover, control means were required for effecting the disengagement, and such control means was at best cumbersome and space-consuming, involving in addition a certain amount of expense in its construction.

The above drawbacks and disadvantages are overcome by the present invention, and an object of the invention is to provide an improved, forced feed for a transducer head, wherein the head may be manually shifted at any time, overruling the feed action, with the utmost speed, convenience and facility.

Another object of the invention is to provide an improved forced feed means as above characterized, which is extremely quiet in its operation, being devoid of disengaging movements, linkages, cams and other operating mechanisms.

Still another object of the invention is to provide an improved feed mechanism for a transducer in accordance with the above, which is accurate in its action at all times and is not dependent on engagement between meshing components which were previously disengaged, to effect the desired positioning.

Yet another object of the invention is to provide an improved feed means of the above type, which is devoid of backlash and lost motion at all times.

The above objects are accomplished in part, by the provision of a novel drive mechanism having an elongate feed screw, such mechanism being characterized by a pinion rotatably mounted on the feed arm and maintained constantly in engagement with the feed screw. The pinion is turnable about an axis parallel with the feed arm and is normally yieldably held against turning thereon by a spring means, whereby it constitutes in effect a threaded follower or half nut. However, in response to lateral force applied to the feed arm, the pinion may turn about its axis while still meshing with the feed screw, thereby travelling along the latter and enabling lateral movement of the feed arm to occur.

A feature of the invention resides in the provision of an improved feed mechanism for a transducer as above set forth, which does not require cumbersome control means but instead has all of the aforementioned advantages and is nevertheless simple in its construction and economical to manufacture.

Other features and advantages will hereinafter appear.

In the drawings accompanying this specification, similar characters of reference indicate corresponding parts wherever possible in the several views, in which:

Fig. 3 is a fragmentary top or plan view somewhat similar to that of Fig. 1 but showing the feed screw in its entirety.

Fig. 4 is a fragmentary vertical section taken on line 4—4 of Fig. 3.

Fig. 5 is a detail, enlarged, of the drive screw and pinion engaged therewith, as depicted in Fig. 4.

Fig. 6 is a left end view of the structures shown in Figs. 4 and 5.

Figure 1:
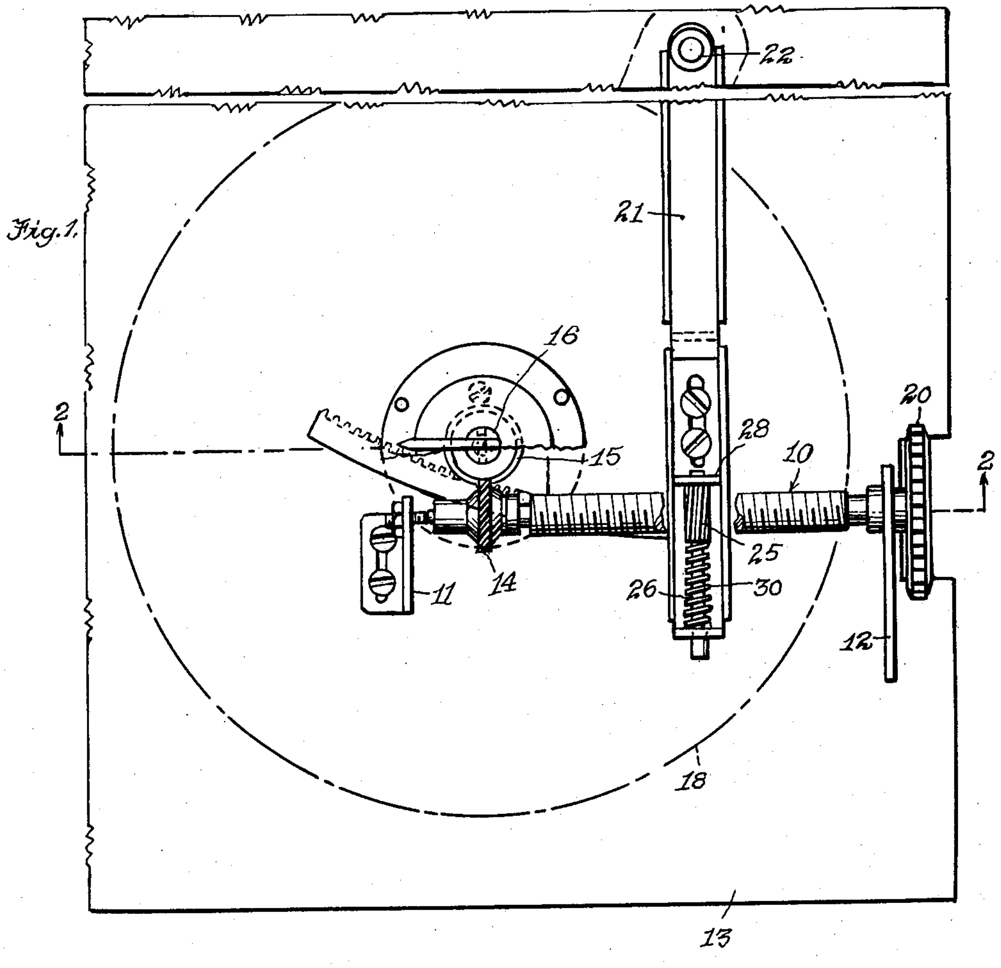
Figure 1 is a top or plan view of the improved feed mechanism of this invention, portions of the said screw being broken away to reveal the engaging pinion.
Figure 2:
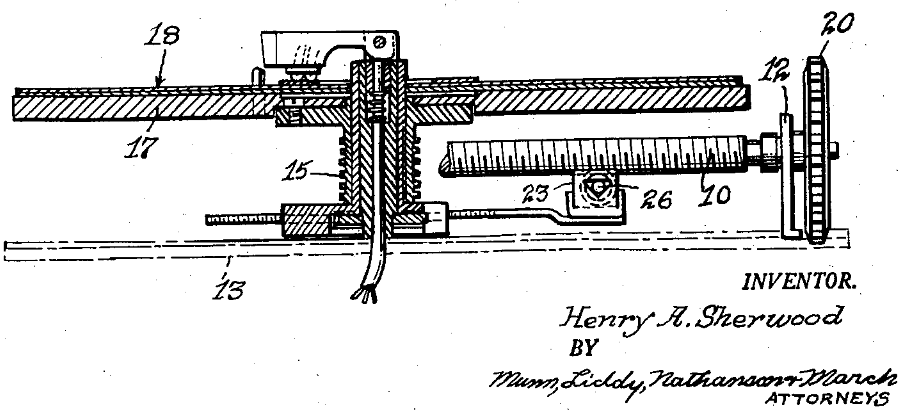
Fig. 2 is a transverse vertical section taken on line 2—2 of Fig. 1.

Referring to Figs. 1 and 2 the improved forced-feed mechanism of the present invention comprises a feed screw 10 mounted on bearings 11 and 12 secured to a base or frame structure 13 of the recording and reproducing machine. The feed screw 10 is frictionally yieldably affixed to a worm gear 14 engaging a wormwheel 15 carried on a vertical shaft or spindle 16 which carries the usual turntable 17, on which the record disk 18 is normally disposed.

As is usual, the feed screw 10 may have a knurled finger wheel 20 by which it can be conveniently adjustably turned to effect a minute positioning of the transducer, as will become apparent as the description proceeds.

In accordance with this invention I provide a novel and improved driving means adapted to be maintained continually in engagement with the feed screw 10, for effecting a uniform forced feed of the transducer head (not shown). This novel means comprises a pivoted feed arm 21 having a pivotal shaft 22 on the base or frame structure 13, the feed arm 21 extending across, and being movable in an arcuate or sector-shaped path longitudinally or axially of, the feed screw 10.

As shown in Fig. 4 the feed arm 21 has a downwardly offset portion 23 and a horizontal extension portion 24, the latter extending under the feed screw 10. By the present invention I provide, on the extension 24 of the feed arm 21, a pinion 25 rotatably carried by a shaft 26 which is turnable in bearings 27 and 28 secured to the extension 24. The pinion 25 has an appreciable length and is adapted to mesh with the feed screw 10 and to remain in engagement therewith at all times throughout the arc of travel of the feed arm 21. I further provide a yieldable friction means comprising a spring 30 on the shaft 26, engaging a washer 31 thereon and also engaging one end of the pinion 25, said spring yieldably holding the pinion against turning but enabling turning movement to occur when sufficient turning force is exerted thereon. During the normal feeding operation of the screw 10, the pinion 25 will not turn, but instead will function in the manner of a follower or split nut, traversing the feed screw 10 with a relatively uniform movement in the manner of a nut threading along a turning screw. However, if at any time an appreciable lateral force is exerted on the feed arm 21, this will be sufficient to overcome the friction provided by the spring 30, thereby resulting in a turning of the pinion 25. For such situations the pinion 25 and feed arm 21 will travel along the screw 10 in either direction, depending on the direction of force applied thereto.

It will be understood that the feed arm 21 may be connected, through the shaft 22, to the usual tone arm and transducer head having a stylus, these components being conventional, and being omitted from the present showing since they constitute no part per se of the invention.

I have found that, by the provision of a feed screw of uniform pitch diameter throughout its length and a pinion having straight teeth or virtually straight teeth axially, a satisfactory meshing engagement occurs throughout the arcuate path of movement of the feed arm 21, without objectionable backlash or lost motion. For illustrative purposes, the pinion 25 is shown with an exaggerated helix angle, whereas the teeth thereof may not slope exactly to the extent shown and still provide satisfactory operation; only a very slight helix angle, if any, can be utilized, and in actual practice the teeth are preferably straight or axial, since the fine thread on the screw 10 does not permit of any appreciable helix on the pinion.

Further, in accordance with the present invention I provide novel bearing means to eliminate lost motion of the shaft 26. Referring to Figs. 5 and 6, the bearing 27 is provided with a triangular-shaped opening 33 accommodating the shaft 26, said opening having a pair of sloping convergent walls 34 and 35 converging in a direction away from the feed screw 10. Also, the feed arm 21 is slightly resilient or flexible, especially at the offset portion 23 and is arranged to bias or yieldably hold upward the pinion 25, as viewed in Fig. 4, thereby to continually maintain the pinion 25 in engagement with the feed screw 10 and to maintain the shaft 26 in engagement with the sloping walls 34 and 35 of the bearing 27. By this organization the slope of the walls 34 and 35 eliminates all tendency for looseness of the shaft 26.

It will be understood that a quick traversal by the feed arm 21 of the feed screw 10 may be readily manually effected at any time upon the operator moving the tone arm (not shown) side ways in either direction. This will result in a turning torque on the shaft 26, and will effect lateral arcuate movement of the feed arm 21, overcoming the friction of the spring 30 and causing a turning of the pinion 25.

It will be readily understood that, by the above organization, I have provided an improved forced feed for a transducer which is extremely quiet, accurate at all times, devoid of components requiring disengagement, and characterized by an absence of lost motion or backlash. Moreover, the improved feed mechanism of this invention does not require separate or cumbersome control means for its operation, but is automatically made operative by the simple step of manually shifting the tone arm of the instrument sideways. The organization as set forth herein is extremely simple in its construction and economical to manufacture.

Variations and modifications may be made within the scope of the claims, and portions of the improvements may be used without others.

I claim:

1. In a device for recording and/or reproducing sound, the combination of an elongate feed screw; a pivotally mounted feed arm adapted to be connected to a tone arm for driving the latter, said feed arm crossing the feed screw; and a pinion rotatably mounted on the feed arm and having substantially axially-extended teeth engaged with the feed screw, said pinion constituting a driving connection between the feed screw and feed arm and being turnable and yieldably frictionally held against turning on said feed arm.

2. In a device for recording and/or reproducing sound, the combination of an elongate feed screw; a pivotally mounted feed arm adapted to be connected to a tone arm for driving the latter, said feed arm crossing the feed screw; and overruling drive means having straight teeth constantly engaging the feed screw, said drive means constituting a driving connection between the feed screw and feed arm and being yieldably frictionally held against movement on said feed arm.

3. In a device for recording and/or reproducing sound, the combination of an elongate feed screw; a pivotally mounted feed arm adapted to be connected to a tone arm for driving the latter, said feed arm crossing the feed screw; and a pinion rotatably mounted on the feed arm and engageable with the feed screw, said pinion constituting a driving connection between the feed screw and feed arm and being turnable and yieldably frictionally held against turning on said feed arm, said feed screw having a uniform pitch diameter throughout is length and said pinion comprising a spur gear having straight teeth.

4. In a device for recording and/or reproducing sound, the combination of an elongate feed screw; a pivotally mounted feed arm adapted to be connected to a tone arm for driving the latter, said feed arm crossing the feed screw; and a pinion rotatably mounted on the feed arm and engageable with the feed screw, said pinion constituting a driving connection between the feed screw and feed arm and being turnable and yieldably frictionally held against turning on said feed arm, said feed screw having a uniform pitch diameter throughout its length and said pinion comprising a spur gear having straight teeth, said feed arm in its travel carrying the spur gear in an arc which extends alongside the feed screw, and the latter and the spur gear remaining continually in engagement with each other.

5. In a device for recording and/or reproducing sound, the combination of an elongate feed screw; transmission means adapted to be driven by said feed screw, said means including a movably mounted feed arm carried by a shaft and adapted to be connected to a tone arm for driving the latter, said feed arm crossing the feed screw; a pinion rotatably mounted on the feed arm and having substantially axially-extended teeth engaged with the feed screw; spring means yieldably holding the pinion against turning, said transmission means further normally yieldably maintaining the pinion in continual contact with the feed screw, even when the feed arm is shifted laterally by force applied to the said shaft.

6. In a device for recording and/or reproducing sound, the combination of an elongate feed screw; a pivotally mounted feed arm adapted to be connected to a tone arm for driving the latter, said feed arm crossing the feed screw; and a rotatable member mounted on the feed arm and having virtually axially extended straight teeth engaged with the feed screw, said member constituting a driving connection between the feed screw and feed arm and being yieldably frictionally held against turning on said feed arm.

7. In a device for recording and/or reproducing sound, the combination of an elongate feed screw; transmission means adapted to be driven by said feed screw, said means including a pivotally mounted feed arm adapted to be connected to a tone arm for driving the latter, said feed arm crossing the feed screw; a pinion; means including a shaft, rotatably mounting the pinion on the feed arm for engagement with the feed screw, said mounting means including a pair of inclined bearing surfaces engaging said shaft and converging in a direction away the said screw, said feed arm normally yieldably holding the pinion engaged with the feed screw and thereby holding said shaft engaged with said inclined surfaces.

8. In a device for recording and/or reproducing sound, the combination of an elongate feed screw; transmission means adapted to be driven by said feed screw, said means including a pivotally mounted feed arm adapted to be connected to a tone arm for driving the latter, said feed arm crossing the feed screw; a pinion; means including a shaft, rotatably mounting the pinion on the feed arm for engagement with the feed screw, said means including a pair of inclined bearing surfaces engaging said shaft and converging in a direction away from the said screw, said mounting means further comprising a triangular bearing on the feed arm, two surfaces of which constitute the said convergent bearing surfaces, said feed arm normally yieldably holding the pinion engaged with the feed screw and thereby holding said shaft engaged with said inclined surfaces.

References Cited in the file of this patent

UNITED STATES PATENTS

| | | |
|---|---|---|
| 675,241 | Pedersen | May 28, 1901 |
| 2,528,190 | Thayer | Oct. 31, 1950 |
| 2,714,010 | Gruber | July 26, 1955 |
| 2,730,369 | Steed | Jan. 10, 1956 |